Figure 1:
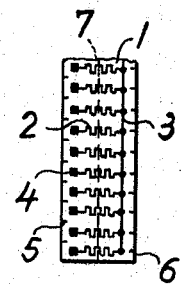

United States Patent Office 3,327,271
Patented June 20, 1967

3,327,271
STRAIN GAUGE
Rudolf Hörnig, Hofingen, Wurttemberg, Germany, assignor to Daimler-Benz Aktiengesellschaft, Stuttgart-Unterturkheim, Germany
Filed Jan. 19, 1965, Ser. No. 426,595
Claims priority, application Germany, Jan. 23, 1964,
D 43,423
4 Claims. (Cl. 338—2)

The present invention relates to improvements in strain gauges for electrically measuring the strains occurring in the materials of certain machine elements when they are subjected to loads.

Prior to this invention, each of these strain gauges consisted of an individual small strip of paper or plastic on which a single fine resistance wire was firmly secured. When the extension of a workpiece due to the strains occurring therein is to be measured, such a gauge strip is firmly attached to the surface to be tested, for example, by gluing it thereon, so that any extension of the workpiece will be directly transmitted to the resistance wire. The ends of this wire are then connected to a suitable apparatus which is adapted to measure the electrical resistance of the wire which changes directly in proportion to its extension. By such resistance measurements it is therefore possible to measure very accurately the extension and strains of a workpiece when subjected to different loads. When prior to this invention a larger surface of a workpiece had to be measured, it was necessary to glue a larger number of such gauge strips thereon so as to be in accurate alignment and at equal distances from each other. This was a rather complicated and tedious operation, especially if the surface to be measured was curved and consisted, for example, of a rounded crank cheek of a crankshaft.

It is an object of the present invention to facilitate this work and to increase its accuracy considerably. For attaining this object, the invention consists in providing a strain gauge strip in the form of a measuring tape of a considerable length which carries a plurality of parallel resistance wires adjacent to and spaced at equal distances from each other.

These resistance wires are electrically connected to each other at one side of the tape and are provided with individual soldering terminals at the other side.

Another feature of the invention consists in providing the measuring tape at one or both sides with marginal markings which may serve as linear measures like the graduations on an ordinary measuring tape for determining the proper length of the gauge strip which is to be cut off the tape in accordance with the length of the surface of the workpiece to be measured and for also quickly determining the number of resistance wires which have to be connected to the measuring apparatus. The marginal markings on one side of the tape are preferably in alignment with the resistance wires while those on the other side are disposed centrally between the adjacent resistance wires so as to serve as cutting guides to insure that, when the tape is being cut to the required length, the resistance wires will not be injured. The tape is further preferably provided with a central marking line or several longitudinal marking lines along its edges to permit a gauge strip of the required length to be easily applied upon the surface of a workpiece in accurate alignment with two points between which a measurement is to be carried out.

Structurally, the measuring tape according to the invention corresponds to the conventional short gauge strips insofar as the resistance wires which preferably consist of a metal alloy for example, constantan, are firmly secured on or embedded within a tape of paper or plastic.

The features and advantages of the present invention will become further apparent from the following detailed description thereof which is to be read with reference to the accompanying drawings, in which—

Figure 2:
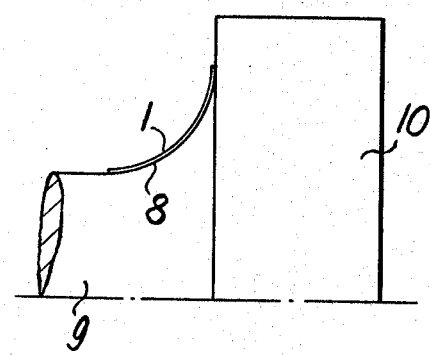

FIGURE 1 shows a plan view of a piece of a measuring tape according to the invention, while FIGURE 2 shows diagrammatically a part of a crankshaft with a gauge strip of the required length applied upon the surface of the rounded crank cheek.

The measuring tape according to the invention is designated in FIGURE 1 by the reference numeral 1 and its resistance wires by the reference numeral 2. All of the resistance wires 2 are of the conventional multi-turn expansion type and are connected at one end to a common conductor 3, while the other end of each of them is provided with marginal markings 5 and 6 which may serve as linear measures and may in addition be provided with scale numerals, while along its center it is provided with a dotted center line 7. The marginal markings 5 are disposed centrally between the soldering terminals of the adjacent resistance wires 2, while the markings 6 are in longitudinal alignment with the individual resistance wires 2. The markings and marking lines may also be made of different colors or different thickness so as to distinguish from each other.

FIGURE 2 illustrates the manner in which the strains are measured which occur, for example, within the rounded part 8 between a bearing part 9 and a crank web 10 of a crankshaft. For this purpose, a gauge strip 1 of a sufficient length is cut off the measuring tape as shown in FIGURE 1 and firmly glued upon the surface of the curved part 8 so that any distortion of this part will be directly transmitted to the resistance wires 2. The terminals of the individual resistance wires of this gauge strip are then connected to the electric measuring apparatus so as to measure their resistance values which change directly in proportion with their changes in length.

The measuring tape according to the invention may be made and sold in the form of shorter strips of a certain length or in the form of rolls on which strips of a considerable length are wound. The width of the tape and the dimensions of its resistance wires, as well as the particular properties thereof do not constitute any features of the present invention and may vary in accordance with the particular measurements to be made.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A measuring tape for electric strain measurements comprising a longitudinal strip of a relatively flexible insulating material readily susceptible to being cut to different lengths and a plurality of multi-turn expansion type resistance wires secured on said strip and extending parallel and at equal distances from each other at substantially right angles to the longitudinal direction of said strip and each adapted to serve as a strain gauge element, a longitudinally extending electric conductor on said strip near one lateral edge thereof connecting all of said resistance wires at one end thereof to each other, and a soldering terminal on the other end of each of said resistance wires near the other lateral edge of said strip, said strip having length markings centrally disposed thereon between the adjacent resistance wires so as to serve additionally as guides for cutting said tape transversely.

2. A measuring tape as defined in claim 1, further comprising length markings on said strip adjacent to both lateral edges thereof, said markings adjacent to one lateral edge being in longitudinal alignment with said resistance wires, and said markings adjacent to the other lateral edge being disposed centrally between the adjacent resistance wires.

3. A measuring tape as defined in claim 2, further comprising at least one longitudinal line marked on said strip and preferably extending centrally thereof and paralled to said lateral edges.

4. A measuring tape as defined in claim 3, in which the different markings on said strip are of different colors.

References Cited

UNITED STATES PATENTS

| | | | |
|---|---|---|---|
| 2,438,589 | 3/1948 | Walker | 338—2 |
| 2,457,616 | 12/1948 | Van Dyke et al. | 338—2 |
| 2,508,456 | 5/1950 | Gustafsson | 338—2 |
| 2,629,166 | 2/1953 | Marsten et al. | 338—307 |
| 2,712,591 | 7/1955 | Rogell | 338—212 |
| 2,834,862 | 5/1958 | Meyers | 219—345 |
| 3,080,748 | 3/1963 | Burkley. | |
| 3,082,139 | 3/1963 | Clark | 338—2 |
| 3,094,678 | 6/1963 | Eisler | 338—2 |

RICHARD M. WOOD, *Primary Examiner.*

W. D. BROOKS, *Assistant Examiner.*